Jan. 19, 1926.
L. P. HYNES
1,570,304
TRAIN DOOR CONTROL SYSTEM
Filed April 9, 1921     5 Sheets-Sheet 1
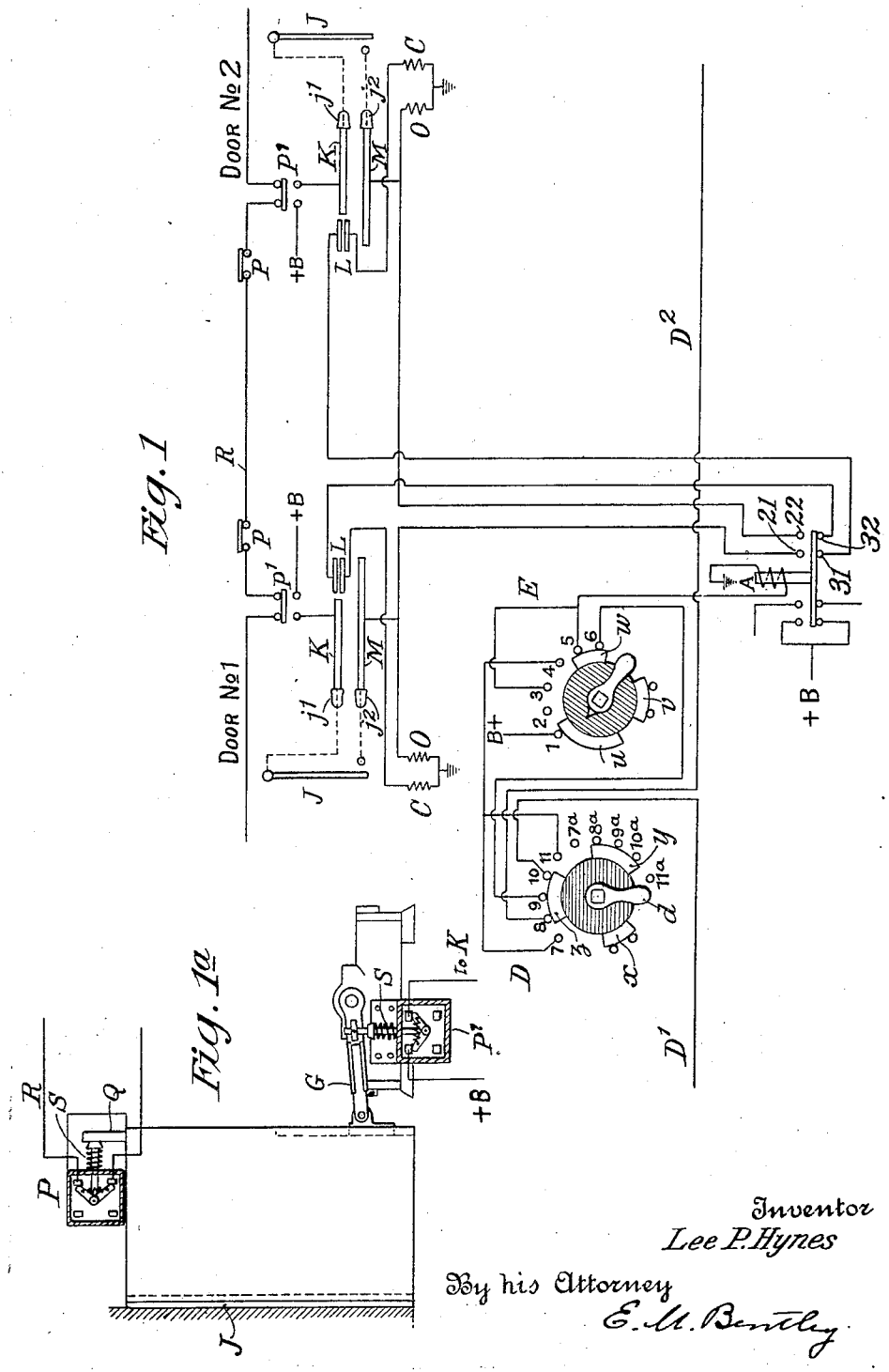
Inventor
Lee P. Hynes
By his Attorney
E. M. Bentley Jan. 19, 1926. 1,570,304
L. P. HYNES
TRAIN DOOR CONTROL SYSTEM
Filed April 9, 1921 5 Sheets-Sheet 2
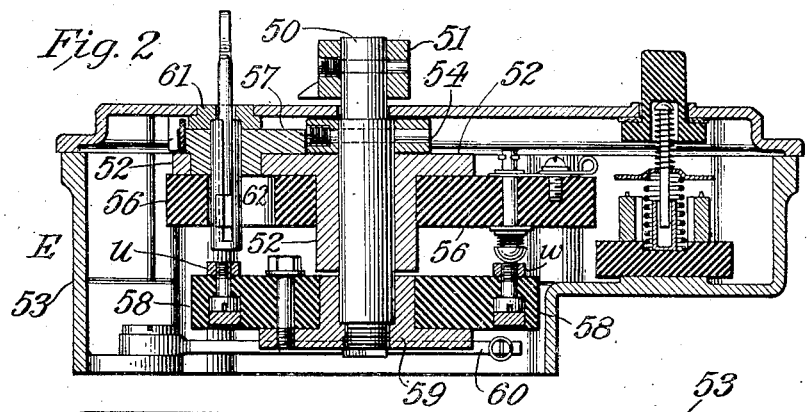
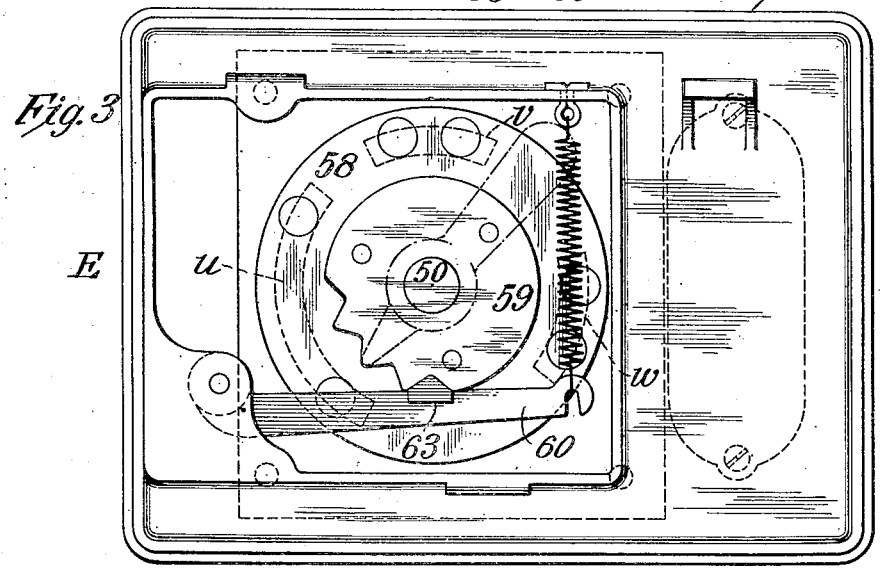
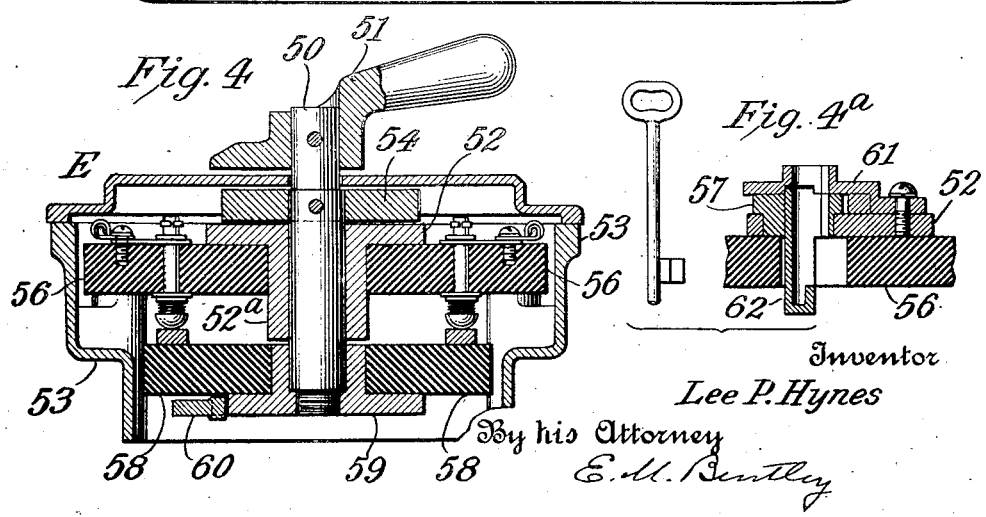
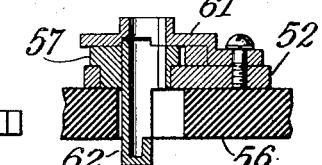
Inventor
Lee P. Hynes
By his Attorney
E. M. Bentley Jan. 19, 1926.　　　　　　　　　　　　　　　　　　　　1,570,304
L. P. HYNES
TRAIN DOOR CONTROL SYSTEM
Filed April 9, 1921　　　　　5 Sheets-Sheet 3

Inventor
Lee P. Hynes
By his Attorney
E. M. Bentley

Jan. 19, 1926.　　　　　　　　　　　　　　　　　　　　1,570,304
L. P. HYNES
TRAIN DOOR CONTROL SYSTEM
Filed April 9, 1921　　　5 Sheets-Sheet 4

Inventor
Lee P. Hynes
By his Attorney
E. M. Bentley

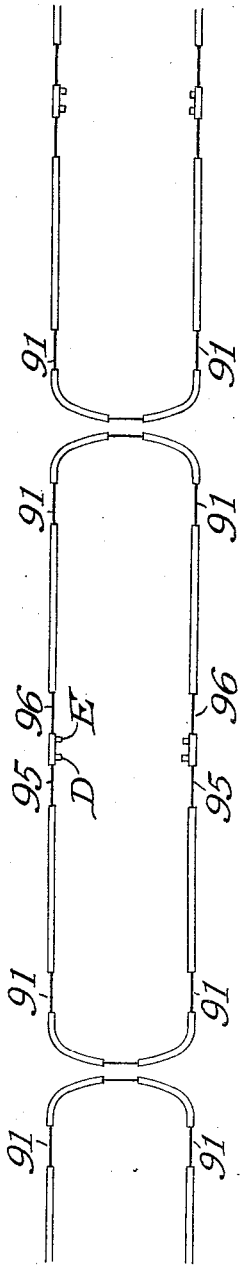
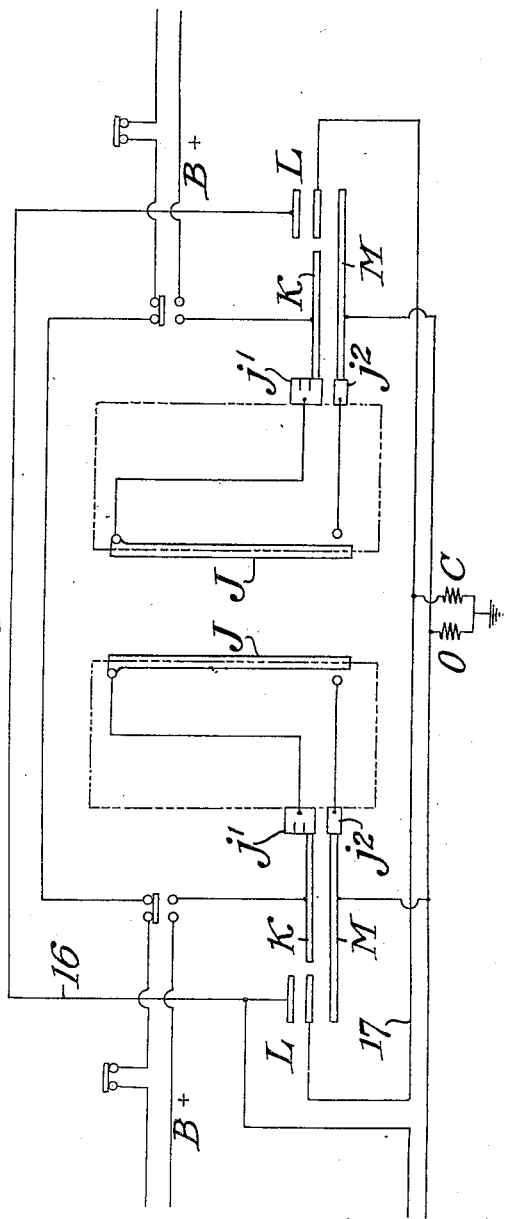

Patented Jan. 19, 1926.

1,570,304

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

TRAIN DOOR-CONTROL SYSTEM.

Application filed April 9, 1921. Serial No. 460,087.

*To all whom it may concern:*

Be it known that I, LEE P. HYNES, a citizen of the United States, residing at Albany, in the county of Albany and State of New York, have invented certain new and useful Improvements in Train Door-Control Systems, the following being a full, clear, and exact disclosure of the one form of my invention which I at present deem preferable.

For a detailed description of the present form of my invention, reference may be had to the following specification and to the accompanying drawings forming a part thereof, wherein Fig. 1 is a diagram of circuits;

Fig. 1ª shows the double contacts for the automatic signal;

Fig. 2 is a section of the door-control switch on the line $b^2$—$b^2$ of Fig. 6;

Fig. 3 is a view thereof from the underside;

Fig. 4 is a section thereof on the line $b^4$—$b^4$ of Fig. 6;

Figure 5:
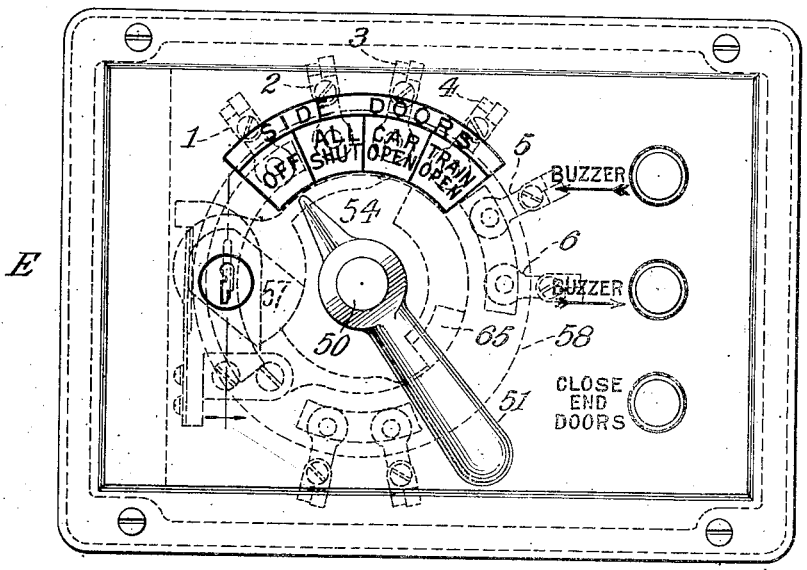
Figure 6:
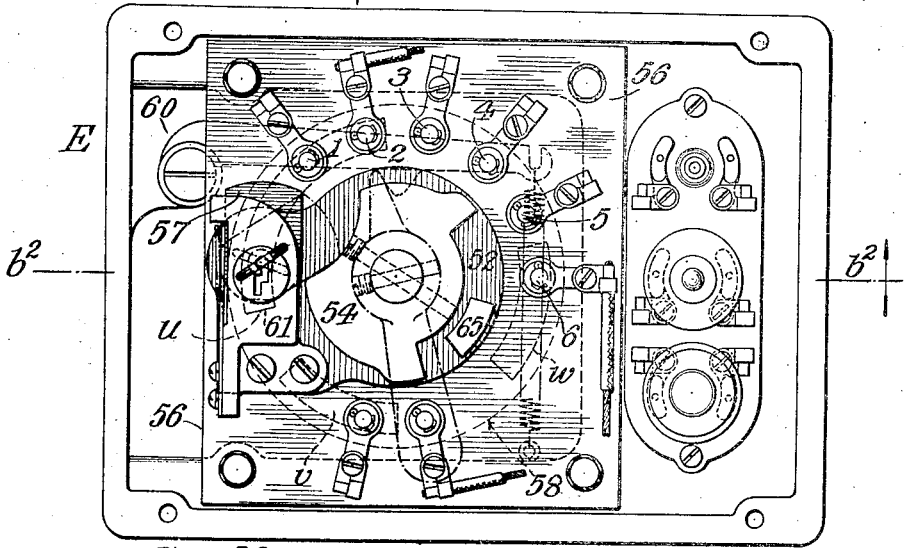
Figure 7:
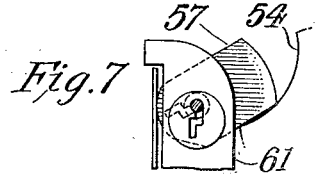
Figure 8:
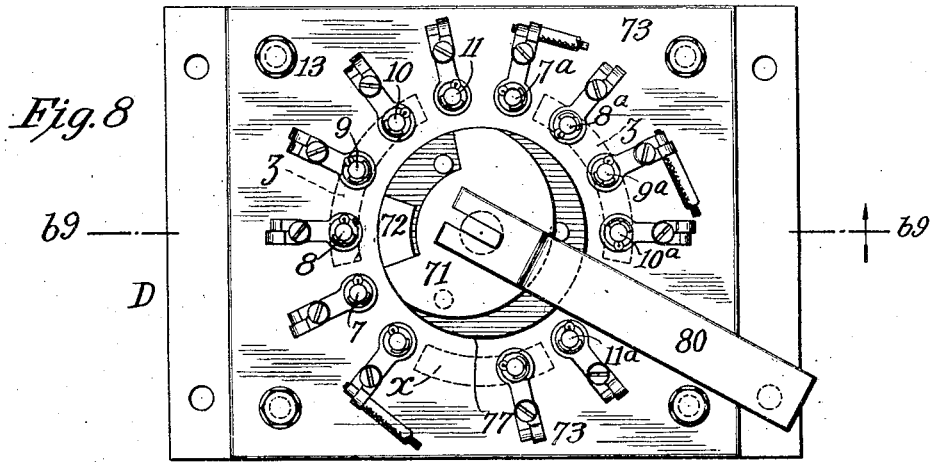
Figure 9:
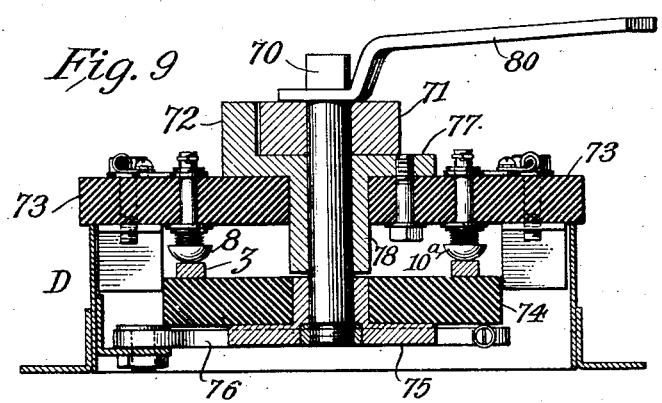

Fig. 4ª shows the lock;

Fig. 5 is a top plan view thereof;

Fig. 6 a similar view with the cover removed;

Fig. 7 a detail of the locking dog;

Fig. 8 is a plan;

Fig. 9 a section on line $b^9$—$b^9$ of Fig. 8; and

Figure 10:
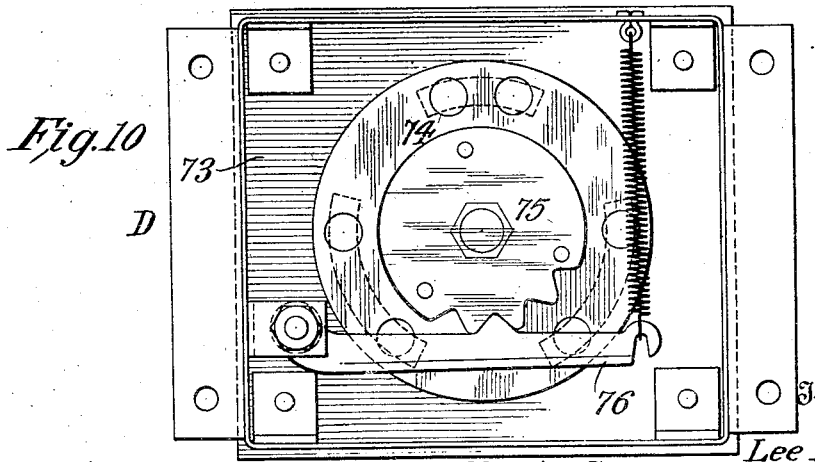

Fig. 10 a bottom view of the setting-up switch.

Figs. 11 and 12 show the system applied to a car.

My invention relates to a car-door operating system which is adapted to open or close from a single point of control all the doors of a car or all the doors of a train composed of any desired number of cars.

In the diagram of Fig. 1 I have, for simplicity, shown only the essential wiring required for the doors on one side of the car or train, it being understood that the wiring here shown will be duplicated for the opposite side. I have also shown such circuits as are required for two of the doors on a single car, it being understood that three or more doors may be used on a single car and that a third or fourth door would involve a mere addition of operating circuits therefor duplicating those here shown for the two doors.

In the diagram of Fig. 1 the doors are represented by the door-shoes J J which are customarily applied to the front edge of the door and which yield, in the event of the door meeting an obstruction when closing, and thereby complete an electric circuit containing the door-opening magnet. The said magnet will cause the door to reverse its closing movement and re-open; but, when reopened it will automatically start to close again and will close completely unless it again encounters an obstruction and repeats its re-opening and re-closing movements.

The system diagrammed in Fig. 1 is of the type heretofore devised by me wherein but a single train-wire serves for all the doors on one side of the train. I have added certain important improvements which, however, are not limited to a system of that one-wire type but may also be used on systems of the older type which require for each side of the car two train-wires, one for the opening, the other for the closing of the door. In particular, I have substituted for the usual mode of door-control by individual push-buttons, a switch of the sliding-contact type that serves both for the train-door and the local door or doors at which the operator is stationed, and is preferably arranged to operate those two sets of doors in a definite sequence. Not only does this give a more reliable electrical operation than is feasible with push-buttons, but it enables the trainman to work both sets of doors by a single handle without fumbling for individual buttons. The operator, while grasping the single handle in one hand, can lean out or step out of the door at which he is stationed to observe the train doors and cause them to close and then re-enter the car and by a further movement of the same handle, close the local door or doors. I further provide, for this purpose, that the operator's station shall be at a side door at or near the center of the car and that the train-wire sections should terminate at this central point of the car, where the operator is provided with a switch to break the continuity of the train wire and to make the fundamental connections for the system, while with his regular door-control switch he works the doors as hereinafter described. In practice this is a pronounced improvement, being especially useful in the breaking-in of new operators who can learn the work much more quickly than heretofore and can make no mistake in it.

The single train-wire aforesaid is shown at $D^1$ $D^2$. The single control switch is shown at E and at D is the setting-up switch that the operator turns in one direction or the other when he takes his station to connect the battery to the system and to give himself control of either the doors ahead of him on the train or those behind him, leaving in control of the next operator those doors which he does not elect to take charge of. The switch D is of the drum type and it may be of the form shown in detail in Figs. 8, 9, 10 to be hereinafter described. As appears in Fig. 1, the switch D carries on its drum three contact plates $x$, $y$, $z$, and is operated by the handle $d$. In the position shown the plate $z$ connects contact points 8, 9 and 10. This is the normal position of the switch when the car on which it is located is not being used as an operator's station, being what may be termed a "receiving" car, in distinction from a "sending" car that serves as an operator's station for working the doors on a group of two or more cars. In this normal position of setting-up switch D the train-wire section $D^1$ is connected to section $D^2$ by means of points 10, 8 and plate $z$. At the same time the train-wire which is thus connected through to other cars of the train, is also connected, by means of point 9, thence by points 5, 6 and plate $w$ on control switch E, with relay A, and thence to ground. Therefore any current coming from another car by the train-wire $D^1$, $D^2$ will energize relay A and the relay will, in a manner to be described later, cause the operation of the doors on the car. If, however, this switch D is at an operator's station—i. e. on a sending instead of a receiving car—then it will be turned, once for all, either forward or backward, according as the operator is to take charge of the doors on one or more cars ahead (as well as of the local doors on his own car) or of those on one or more cars behind his own. If he takes on those ahead—say to the right—then handle $d$ will be turned to the right. That will cause the aforesaid plate $z$ to bridge contact-points 7, 8, 9, instead of 8, 9, 10 as shown. The point 10 which connects as aforesaid with train-wire section $D^1$, will be left open, but $D^2$ (which is now continuous up to the next operator's station where it becomes the counterpart of $D^1$ herein shown) will be still connected, by points 8, 9, points 5, 6 and plate $w$ of switch E, with the aforesaid relay A. Moreover $D^2$ is now connected to point 7 (instead of point 10) of the setting-up switch and, by that point 7, to point 4 of switch E, which point 4 is shown in Fig. 1 as open ended, but is the one by which the operator will admit current to $D^2$ whenever he desires to open the doors in the cars ahead which train wire $D^2$ traverses. On those cars ahead $D^2$ will still be connected to the relays A by contacts 9 of the several cars which are receiving cars and which therefore have their setting-up switches D set in normal position as shown in Fig. 1. At the next sending car, however, $D^2$ will be open ended, for there the setting-up switch D will also be turned from its normal, receiving-car condition and contact 10 thereon open-ended. If handle $d$ of switch D were turned to the left, instead of the right, the only difference would be that contact point 8, leading to section $D^2$ would be the open-ended one and point 10, leading to section $D^1$ would be left closed. The point 11, which would then be engaged by the plate $z$ is connected with the same wire as point 7, being permanently connected thereto. The contact points $7^a$, $8^a$, etc., will be similarly used in connection with a train wire serving for the doors on the opposite side of the train.

Assuming that switch-handle $d$ is turned to the right, as aforesaid, then the car is in condition to act as a sending car, the operator located here being now ready to work the doors ahead of him, as well as his own local doors, by means of switch E. To open his own doors he will turn switch E clockwise until contact plate $u$ thereon bridges points 1, 2, 3. Of these three, point 1 leads to the positive battery terminal and the battery is now connected to points 2 and 3. The connections of point 2 are not shown, being merely the battery-supply connections for the buzzer buttons and other buttons with which we are not now concerned, but contact point 3, to which battery is now connected, is the one leading to the local relay A. The train-line connection to relay A by way of contact points 9, 6 and 5 is simultaneously broken by plate $u$ moving off 5 and 6. So, by moving switch E far enough to bring plate $u$ into contact with point 3, the operator can work his own local relay A and open the doors on his own car, but can not work the doors on other cars. For the latter purpose he must move the switch E a second step, thereby bringing the battery contact-plate U to point 4. Then the battery current will pass from said point 4 to point 7 on switch D, which is now engaged by plate $z$, from which it goes by plate $z$ and point 8 to train wire $D^2$. It will be manifest that this arrangement establishes a definite sequence in the opening of local and train doors, the local doors opening first. Conversely, the train doors close first, the local doors afterward, as will be pointed out in detail later. Moreover, the operator controls the time at which each set of doors will open or close, but not the sequence or order and he has to work but a single handle. This reduces to a minimum his chances of error and confusion; he does not have to select from a series of push buttons, nor to use his eyesight. With one hand grasping the handle he can watch outside the car his opportunity to close the train doors. He can not open the train doors till he has first opened those of his own car. This does not involve delay because he can move at once from point 3 to point 4, merely initiating the actions of the two sets of doors in the prescribed order, for, when once started, the doors will continue their movement.

I will now explain the mode in which the relay A causes the doors to act in my single-wire system. The principle is that when the relay is down, it puts battery on the door-closing circuit, and, provided a door is then open, it will proceed to close. This dropping of the relay requires merely the opening of the relay circuit. The closing of the relay circuit will cause the door to open, provided it is then closed. These open and closed circuit conditions can obviously be secured with only a single train-wire for each side of the train whereas, heretofore two train-wires have been required, one for the opening and the other for the closing of the doors, making four wires in all for the two sides of the train. I have shown two doors No. 1 and No. 2 but others may also be used. At each door the door-closing magnet is marked C and the door-opening magnet O. I have not shown their association with a door-engine, the art being familiar with the use of such magnets to operate the valves of a pneumatic engine for either the opening or the closing action. The lifting of relay A obviously connects the battery to the back contact points 21 and 22 which lead to opening magnets O at the respective doors and thence to ground, while the dropping of relay A obviously connects the battery to front contact points 31 and 32, which lead to the closing magnets C, C at the respective doors, (provided contact bars L are closed) and thence to ground. The door on which the door-shoe J is mounted, is also provided, in a well known way, with contact brushes $j^1$, $j^2$ connected respectively to the contacts which the door-shoe acts to close when it meets an obstruction, and bearing respectively on the fixed metal bars K and M. As the door opens, brush $j^1$ finally leaves bar K and bridges the two short bars L, while $j^2$ always remains in contact with bar M, as the door travels to and fro. The bar K is the battery bar, but when the door is closed, as it is represented in Fig. 1, the battery is cut off by switch $P^1$, so as to disconnect the door shoe from the circuit. When the door starts to open, the switch $P^1$ is thereby (see Fig. 1ª) automatically operated to close the circuit from the battery to bar K. Where an automatic starting signal dependent on closure of the doors is employed, the opening movement of the door will open the circuit to said signal so that no signal may be given to the motorman until the door is closed. The switch $P^1$ is operated by the door engine, while the door itself operates a similar switch P in the said signal circuit R. This arrangement is illustrated in Fig. 1ª wherein the switches P and $P^1$ are shown as of the toggle-snap type. Both P and $P^1$ are operated in one direction by a spring S to open the signal circuit R, and are operated in the opposite direction, viz, to close the signal circuit, by the door-engine arm G in the case of switch $P^1$, and by the projection Q on the door in the case of switch P. It will be recalled that the door carries the shoe J at its forward edge which strikes the door-jamb when the door closes. The shoe may thereby be pressed inward more or less against the door as it would be if it met an obstruction while in the act of closing. Moreover, the door is finally locked in its closed position by the door arm G which closes the door and then moves slightly below its horizontal or dead-center position to insure that any lock-thrust on the door will act endwise on the arm and not be able to turn the arm backward around its center. At the time the door-arm is passing its dead center it moves the door but a slight distance for a considerable movement of the arm. Moreover the arm G is compressible longitudinally to a certain extent and therefore the engine can move on for a slight distance after the door itself has finished closing. It therefore becomes important that the closing of the automatic signal circuit should be governed by the door-engine as well as by the door, it being equally important that, when the door is closed, the door shoe should be disabled so as to prevent its being used by an unauthorized person as a means of opening the door while the train is running. For this reason the battery is automatically cut off from the door-shoe circuit as heretofore explained when the door is closed (see Figures 1 and 1ª). With my device it is made certain that the door will not only be closed sufficiently to operate switch P, but also that the engine arm is fully down in its locking position, before the automatic starting signal can be given to the motorman.

I will now describe the details of setting-up switch D and control switch E, the latter, as appears in Figs. 2 to 7 inclusive, having a rotating spindle 50, with a handle 51, mounted in the bushing plate 52 within the box 53. The bushing plate 52 is carried by a rectangular plate of insulation 56 (see the top plan view of 56 in Fig. 6) and has a depending hub portion (see Figs. 2 and 4) through which spindle 50 passes, with a flange portion lying on top of 56 and circular in outline at one side where it is enlarged to receive the lock. The spindle 50 carries at its lower end (see Figs. 2 and 4) an insulating disc 58 on the upper side of which are mounted the aforesaid contact plates $u$, $v$ and $w$. This disc 58 is fast on and rotates with spindle 50, the center of it being bored out to receive the hub of a star-wheel 59 which is screwed on the lower extremity of spindle 50 and, as best seen in Fig. 3, has the notches in its periphery engaged by a beveled pin 63 on the spring-lever 60. Above the rotating disc 58 and parallel thereto is the aforesaid stationary insulating plate 56 on the under side of which are the spring contact points 1, 2, 3, 4, 5 and 6 which cooperate with said plates $u$, $v$ and $w$ that are on the upper side of disc 58 and rotate therewith. These several contact points have shanks which pass up through the stationary insulating plate 56 and on the top of plate 56 are provided with connectors for the wires that lead therefrom. These connectors are shown in Fig. 6 wherein there is a top plan view of the said plate.

On the spindle 50 and secured thereto just above bushing plate 52 is a locking disc 54 having the contour shown in Fig. 6. In this figure it appears that on the right-hand side of 54 the disc is cut away on an arc to provide stops on either side of a stud 65 that projects up from the bushing-plate 52. These stops determine the extreme limits of oscillation of the switch. On the left-hand side the locking disc 54 is cut away on an arc struck from a center external to the disc. In Fig. 5 this disc is shown in dotted lines in one of its extreme positions determined by said stud 65, to-wit, its "off" position, that being the position shown in the diagram of Fig. 1 and the "receiving" position in which it is left when the key is removed after locking the switch. In this position the locking dog 57 stands at right angles to the curved surface at the left of disc 54 so that the spindle 50 obviously can not be turned. The switch is now locked. The dog 57 is mounted to rotate on the bushing-plate 52 as will be seen by reference to Figs. 2 and 4 and at its center of rotation is provided with a key socket 62. An escutcheon plate 61 screwed down on plate 52 keeps the dog in place. In a circular boss on the escutcheon plate 61, which comes out flush with the external face of the box cover, is a keyhole corresponding in contour to that in the key socket 62. When the two keyholes register with each other, which only occurs when the dog 57 is in its locking position shown in Fig. 5, then the key can be inserted in the socket or withdrawn therefrom. If the key is then inserted in the socket, it can be turned and the dog thereby rotated out of its locking position of Fig. 5, into the position shown in Fig. 7 and finally to its full releasing position shown in Fig. 6. The switch is now free to be operated, but the key is no longer removable; the turning of the dog 57 has trapped the key in the lock. Moreover, it will be manifest from an inspection of Figs. 7 and 6 that the operator can not turn his key and the dog back to locking position, and so recover his key, unless he first turns the switch back to the "off" position. He is thus compelled to turn the switch back and lock it, before he can recover his key and then the switch is left in its proper position and locked against any unauthorized use, or its use by anyone who has not the correct key.

Referring to Fig. 5 and the notation thereon for the different positions of the switch, the position "all shut" is one that merely gives a battery connection for the buzzer circuit. At the next position, "car open", the contact plate $u$ has reached point 3 and the relay A has opened the local doors on the operator's own car, the rest of the doors on the train under control of this operator being still closed. At the last position "train open" the plate $u$ has reached point 4 and the train line has now excited the relays on the other cars covered by this section of train line. The star-wheel will, of course, tend to arrest the switch at each of these working positions and maintain it there until force is applied to the handle sufficient to move it another notch.

In Figs. 11 and 12 I have shown the mode of applying the above described system to a train, it being my purpose to locate each control switch and associated setting-up switch at the middle of a car and on one side thereof with a car door, or preferably two car doors, immediately adjacent thereto. The train line sections will thus extend from the middle of one car to the middle of the next, the train-wire jumpers from car to car being merely included in the sections and not marking the section ends. By this means I require but one setting-up switch per car and a single control switch for each side of the train, the setting-up switch being immediately adjacent to and accessible from the control switches. Moreover the operator can from this middle side door conveniently step out on the platform and from there operate the train doors in the way I have explained before re-entering, finally closing the door of his own car after entering. Thus in Fig. 11, 95 and 96 represent two doors in the center of the car on each side of the car, additional side doors being shown at 91, 91, etc. The doors 95, 96 open away from each other and on the narrow wall which separates them are located the switches D and E which I have described above. The operation of both 95 and 96 is controlled by a single circuit containing magnet O for opening and a single circuit containing magnet C for closing, as illustrated in Fig. 12. The operation of these doors is the same as that of the single door illustrated in Fig. 1, but the opening magnet O is connected to both contact bars M so that either shoe J, in the event of its encountering an obstruction while closing, will complete the circuit from battery bar K to bar M which leads to the opening magnet O and cause both doors to reverse to the opening direction, although but one of the two shoes J J has encountered the obstruction. The short bars L L are also connected so that when either door reaches its open position, its brush $j^1$ will bridge its two short bars L and thereby energize closing magnet C and both doors will automatically re-reverse to the closing direction, even if but one of them has been fully opened. Thus neither door can, by sticking, frustrate the automatic door-shoe reversals of the other door, while either one may be locked and the other one used alone.

I would add regarding the aforesaid switch $P^1$ that another function of this arrangement is to avoid disabling the door shoe (by cutting off the battery) till the door is fully closed. Heretofore the disabling of the door shoe has been produced by shortening bars K and M so that brushes $j^1$ and $j^2$ would break contact therewith as the door approached its closed position. That method left the shoe disabled while the door was still open an inch or two and so the shoe could not respond if a thin article such as a lady's dress were caught in the door with perhaps a button or fold to prevent its being pulled out. In consequence the starting signal would be given while the dress was still caught and held. It is manifestly of great importance to keep the shoe in operative condition until the very last moment and to avoid giving the starting signal until it is certain that the door is closed without any interposed object. This is insured by my arrangement. Not until the operating door arm is fully down is the toggle-switch released to the force of its actuating spring. Then it acts and both disables the shoe and simultaneously closes the starting signal circuit.

What I claim as new and desire to secure by Letters Patent is:

1. In a train door-control system the combination with a train line and door-operating means controlled thereby on the several cars of a train, of local switch-contacts for energizing said train-line, associated switch-contacts for separately operating doors on one car of the train, and a common operating means for the two sets of contacts.

2. In a train door-control system the combination with a train line and door-operating means controlled thereby on the several cars of a train, of local switch-contacts for energizing said train line, associated switch-contacts for separately operating doors on one car of the train and means for operating the two sets of contacts in a predetermined sequence only.

3. In a train door-control system the combination with a train line and door-operating means controlled thereby on the several cars of the train, of local switch-contacts for the said train line and for the door-operating means on an individual car, the door-operating means controlled by the train line acting to open those doors later than, but to close them earlier than the said means on the individual car.

4. In a train door-control system, the combination with a train line and door-operating means controlled thereby on the several cars of the train said means including a relay on each car and valve-magnet circuits controlled thereby, of a local circuit on one car containing the relay of that car, a supplementary circuit on the same car for energizing the train line, and means of operating said local circuit and said supplementary circuit in a predetermined sequence.

5. In a train-door-control system the combination with a train line, door opening and door closing circuits, and door-operating means controlled thereby on the several cars of the train said means including a relay acting when energized on the door-opening circuits and when de-energized on the door-closing circuits, of switch-contacts on one car acting to energize the relay on that car and to separately energize the relays on the other cars through said train-line.

6. The combination with a series of car-doors and operating means therefor, of valve-magnets for the several operating means, switch-contacts for the circuits of the several magnets and means for opening or closing the doors by said switch contacts in a predetermined sequence only.

7. The combination with a series of car-doors and operating motors therefor, of a valve-magnet for each motor and a local switch for all of the valve-magnets, said local switch having the contacts for the respective valve-magnets arranged for the operation of the several doors in a predetermined sequence.

8. The combination with a series of car doors and operating motors therefor, of valve-magnets for the respective motors, circuits for the several magnets leading to a common point, a switch at said point controlling the said circuits in a predetermined sequence, and a lock for holding the switch in a predetermined position.

9. The combination with a series of car-doors and operating motors therefor, of a controlling magnet for each motor, normally-open circuits for the said magnets controlled from a common point, a switch at the said point having contacts controlling the respective circuits in a predetermined sequence, and a key-trapping lock for retaining the said switch in a predetermined position.

10. The combination with a series of car-doors and operating motors therefor, of a controlling magnet for each motor, a circuit for each magnet, the several magnets being controlled from a common point, a rotating switch at said point, and a circular series of contacts thereon for controlling said circuits respectively and in a predetermined succession.

11. The combination with a series of car-doors on a train and operating motors therefor, of a train line, a relay therein on each car, circuits from the doors on each car controlled by the said relay, a separate circuit on each car for locally controlling doors on the individual cars, contacts on each car for said separate circuit, train line contacts on each car and a single switch handle operating both the train line contacts and the contacts of the said separate circuit.

12. The combination with a series of car doors and motors therefor, of magnets for the respective motors, a train line, a relay on each car, having both front and back contacts, circuits for the said magnets leading to said front and back contacts, circuit breakers for the train line, one on each side of the connection from the train line to the relay, means for locally controlling the magnets of each car and separate switch contacts for said means and for the train line.

13. The combination with a series of car doors and operating motors therefor, of a signal line and two circuit closers in said line at each door, one operated by the door and the other by the motor for that door.

14. The combination with a series of car doors and operating motors therefor, of a yielding connection between each door and its motor, a signal circuit, and in said circuit two circuit-closers at each door, one operated by the door itself and the other by the motor for that door.

15. The combination with a series of car doors and operating motors therefor, of a signal circuit and in said circuit two circuit-closers in series, one operated by the door itself and the other by the door motor.

16. The combination with a series of car doors and operating motors therefor, of a signal circuit and in said circuit two snap circuit-closers at each door, one tripped by the door and the other by the motor of that door.

17. The combination with a series of car doors on a train opening into the body of the several cars at one side thereof and operating motors for said doors, of a train line, a relay therein on each car, local door-circuits controlled by said relay and a control switch contiguous to one of the said doors having contacts for the said train line and for the said local circuits.

18. The combination with one car of a train having a door opening into the body of the car at one side thereof, of an operating motor for said door, a train line, relays in said train line on the respective cars of the train, door-circuits controlled by each relay and on the one car aforesaid a switch at the said door for separately controlling the motor of that door and the train line leading to the other cars of the train.

19. The combination with one car of a train of a side door opening into the body of the car at the middle part thereof, a switch at said door and a train line for operating doors on other cars of the train, said switch containing contacts for controlling said train line and also controlling a door on the car where said switch is located, in predetermined sequence.

20. The combination with double side doors on one car of a train opening into the body of said car of motors for the respective doors of the train, a train line, door-circuits for the respective motors of the train doors and a switch at the said double doors controlling them and also controlling the doors on other cars of the train through said train line, in predetermined sequence.

21. The combination with one car of a train having a side door opening into the body of the car, of motors for the respective doors on the several cars of the train, a train line and a switch at the aforesaid side door controlling by one handle the said side door and also the other doors of the train through said train wire, in predetermined sequence.

22. The combination with one car of a train having a side door opening into the body of the car, of motors for the respective doors on the several cars of the train, a train wire, control circuits for the respective motors, and a switch at the said side door controlling in a predetermined sequence the said side door and the other doors of the train.

23. The combination with one car of a train having a side door opening into the body of the car, of motors for the respective doors on the several cars of a train, a train wire, circuits for the several motors controlled by the train wire, switch contacts at the said side door for sectioning the train wire, and associated switch contacts for separately controlling the local doors on the said car and the doors on other cars of the train through said train wire.

24. The combination with a series of car doors and motors therefor, of controlling magnets for the respective motors, a switch containing contacts controlling the circuits of said magnets in predetermined sequence, a key controlled member for locking said switch in a given position, and a stop for said member set by the switch when out of its locking position.

25. The combination with a series of car doors and motors therefor, of magnets controlling the respective motors, a switch controlling the circuits of said magnets in predetermined sequence, a key-controlled member for locking said switch in a given position, and a lock for the key operative when said member is out of its locking position.

26. The combination with a series of car doors and motors therefor, of magnets controlling the several motors, a switch controlling the circuits of said magnets in predetermined sequence, and a key-controlled member for locking said switch in a predetermined position.

27. The combination with a series of car doors and motors therefor, of magnets controlling said motors, a switch controlling the circuits of said magnets in predetermined sequence, a locking member for said switch having a key-receiving space and a relatively stationary member having a key space registering with the said space in the locking member only when said locking member is in a predetermined locking position.

28. The combination with a series of car doors and motors therefor, of magnets controlling the respective motors, a switch controlling the circuits of said magnets in predetermined sequence, and a key-controlled member for locking said switch in its door-closing position.

29. The combination with a series of car doors and motors therefor, of magnets controlling the respective motors, a switch controlling the circuits of said magnets in predetermined sequence, a key-controlled member for locking said switch in its door-closing position and means for retaining the key when the switch is in its door-opening position.

30. The combination with a series of car doors and motors therefor, of magnets controlling the respective motors, a switch controlling the circuits of said magnets in predetermined sequence, comprising stationary and moving contacts engaging each other in different positions, and means for locking said switch at a point dependent on the open or closed position of the doors.

31. In a car door controlling mechanism, the combination with a plurality of electrically controlled door engines for controlling the operation of a plurality of car doors, of a manually operated switch for controlling the electric circuits of said door engines to thereby effect the operation of the car doors and a selector device for establishing the circuits between said switch and the door engines, said manually operated switch having one position in which the door engines connected thereto by the selector device are operated to open the car doors, and another position in which said door engines are operated to close the car doors.

32. In a car door controlling mechanism, the combination with a plurality of electrically controlled door engines for controlling the operation of a plurality of car doors, of a manually operated switch for controlling the electric circuits of said door engines to thereby effect the operation of the car doors and a selector device having a position for establishing the circuit through which the switch controls one door engine while opening the circuit through which the switch controls another door engine, said manually operated switch having one position in which the door engines connected thereto by the selector device are operated to open the car doors, and another position in which said door engines are operated to close the car doors.

33. In a car door controlling mechanism, the combination with a plurality of electrically controlled door engines for controlling the operation of a plurality of car doors, of a switch for controlling the electric circuits of said door engines and a selector device having positions for establishing electrical connection from the switch to one door engine while the electrical connections to another door engine are opened, said manually operated switch having one position in which the door engines connected thereto by the selector device are operated to open the car doors, and another position in which said door engines are operated to close the car doors.

Signed at Albany, county of Albany and State of New York, this fourth day of April, 1921.

LEE P. HYNES.